July 14, 1953 — N. A. STEGMAN — 2,645,307
FLUID PRESSURE BRAKING SYSTEM
Filed June 21, 1949
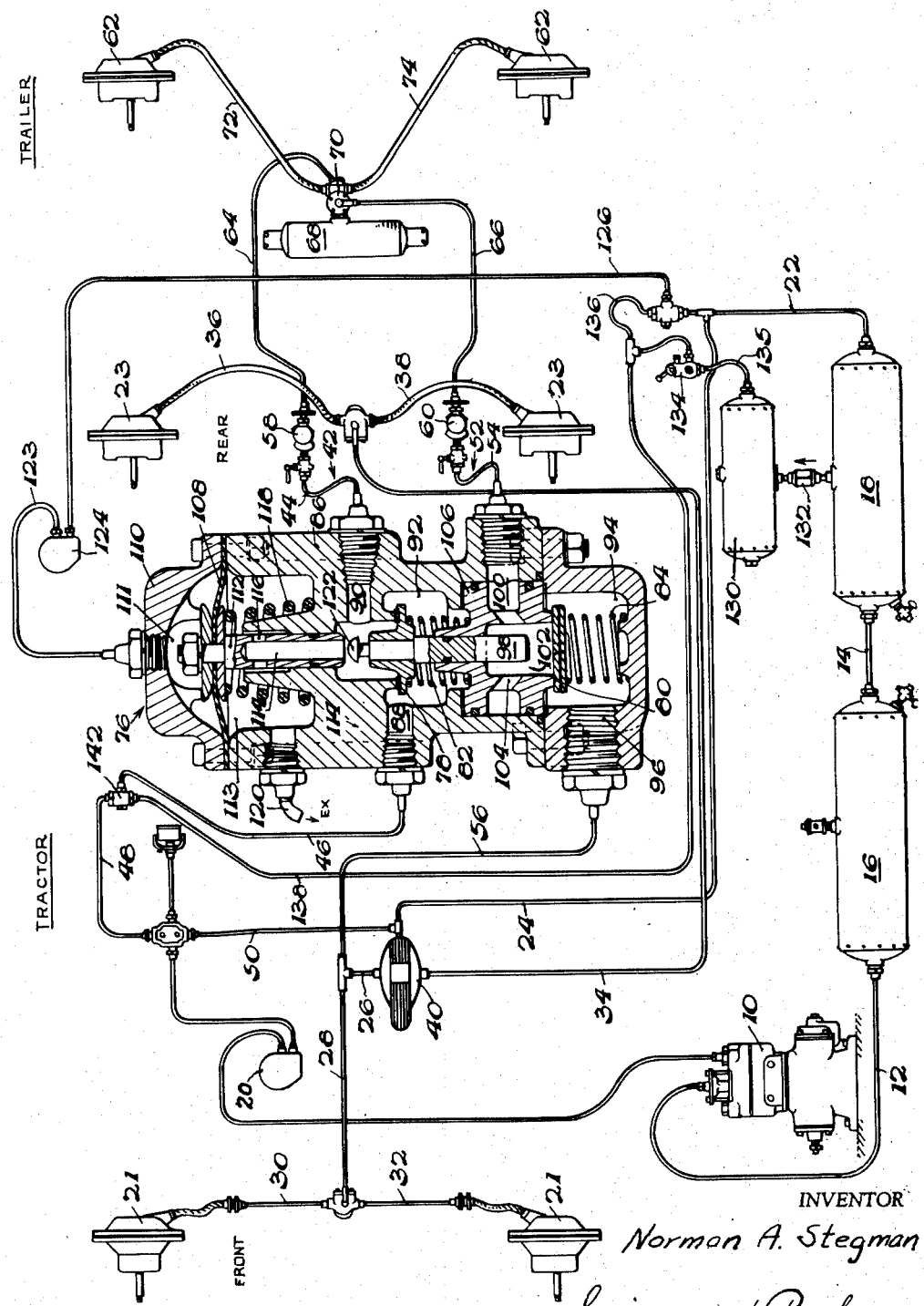
INVENTOR
Norman A. Stegman
BY Scrivener + Parker
ATTORNEYS

UNITED STATES PATENT OFFICE 2,645,307

FLUID PRESSURE BRAKING SYSTEM

Norman A. Stegman, Elyria, Ohio, assignor to Bendix-Westinghouse Automotive Air Brake Company, Elyria, Ohio, a corporation of Delaware Application June 21, 1949, Serial No. 100,425

7 Claims. (Cl. 188—3)

This invention relates to fluid pressure braking systems for tractor-trailer vehicles and more particularly to braking systems embodying safety features for conserving fluid pressure on the tractor in the event of leakage of fluid from the various brake lines on the vehicles.

In tractor-trailer braking systems of the conventional type, various safety arrangements have been heretofore proposed for the purpose of preventing the entire loss of fluid pressure from the tractor in the event the vehicles break away on the highway or should the service or emergency lines develop a severe leak. For example, in the copending application of Ellery R. Fitch et al. filed June 21, 1949, Serial No. 100,498 for Tractor Protection Valve for Braking Systems and owned by the same assignee as the present application, a novel system is disclosed for shutting off communication between the tractor and trailer emergency and service lines in the event of a break-in-two of the vehicles. In the copending application, the interruption of the fluid flow between the vehicles is controlled by the pressure in the tractor reservoir when such pressure reaches a predetermined low value. Under such conditions, further loss of pressure from the tractor braking system is prevented, and the tractor may be quickly and efficiently braked under the control of the operator.

When the flow of fluid between the vehicles is interrupted in the copending application, as stated above, the construction is such that the trailer emergency line is vented to atmosphere which causes an emergency application of the trailer brakes in well known manner. This action is desirable where the interruption follows a break-in-two or the development of a severe leak in the emergency line. However, in certain instances, as for example, when the tractor reservoir pressure falls below the pressure necessary to maintain communication through the emergency and service lines, an undesired emergency application of the trailer brakes may occur. The principal object of the present invention is to provide a novel arrangement whereby such an undesired emergency application may be quickly and efficiently released.

Another object is to provide in a braking system of the above character, a constantly available and separate source of fluid pressure on the tractor for charging the trailer emergency line in order to release an undesired trailer emergency brake application arising from a decrease in the pressure of the fluid in the tractor reservoir.

A further object is to provide a novel and efficient control of the separate source whereby the operator may readily effect release of the undesired emergency trailer brake application.

Other objects and novel features of the invention will appear more fully hereinafter from the following detailed description when taken in connection with the accompanying drawing illustrative of one form of the invention. It is to be expressly understood however that the drawing is utilized for purposes of illustration only and is not to be taken as a definition of the limits of the invention, reference being had for this purpose to the appended claims.

Referring to the drawing, the single figure diagrammatically illustrates the present invention in connection with a tractor-trailer braking system, certain of the parts being shown in section.

As shown, the present invention is utilized in connection with a tractor-trailer braking system of the type disclosed in the aforementioned copending application. More particularly, the tractor braking system includes a compressor 10 for supplying compressed air through conduits 12 and 14 to a pair of serially connected reservoirs 16 and 18, the loading and unloading of the compressor being preferably controlled by a governor 20 which may be constructed as shown in the patent to B. S. Aikman, No. 1,754,218 dated April 15, 1930. Front and rear brake chambers 21 and 23 are provided for applying the tractor brakes and these chambers may be supplied with air pressure from the reservoir 18 through conduits 22, 24, 26, 28, 30, 32, 34, 36 and 38, a suitable pedal-operated brake valve 40, which may be constructed as shown in the patent to W. J. Andres et al. No. 2,133,275 dated October 18, 1938, being associated with the conduits 24, 26 and 34, for controlling the degree of brake application.

In order to provide suitable connections for the trailer braking system, the tractor braking system includes an emergency line 42 comprising conduits 44, 46, 48 and 50, as well as a service line 52 which includes conduits 54 and 56. The emergency and service lines 42 and 52 terminate in coupling parts of well known construction which are adapted to be coupled with similar parts associated with the trailer braking system in order to provide releasable couplings 58 and 60.

The trailer braking system includes a plurality of brake chambers 62, an emergency line 64, a service line 66 and a trailer reservoir 68, all of the foregoing being interconnected through a relay-emergency valve 70 of any suitable type, as for example, that shown in the patent to S. Johnson, Jr., No. 2,018,212 dated October 22, 1935. As is well known in the art, the valve 70 includes a relay valve portion to which the service line 66 is connected and an emergency valve portion to which the emergency line 64 is connected. The operation of the valve 70 is such that it normally connects the emergency line 64 with the reservoir 68 to maintain the latter charged with air pressure from the tractor reservoir 18 and also connects the trailer reservoir 68 with the brake chambers 62 through conduits 72 and 74 whenever the service line 66 is charged through operation of the tractor brake valve 40. Also, in the event of a break in the emergency line 64, as for example, during a break-in-two of the vehicles, the valve 70 would function to supply air pressure to the brake chambers 62 from the reservoir 68 to effect an emergency application of the trailer brakes.

From the foregoing, it will be appreciated that in operation, should the vehicles become separated, or should a severe leak occur in the emergency or service lines of either vehicle, the air pressure supply in the tractor reservoir may be depleted so rapidly as to prevent efficient application of the tractor brakes. Means are provided for overcoming this difficulty in a manner which will appear more fully hereinafter.

More particularly, such means includes an arrangement for interrupting the communication between the tractor and trailer emergency and service lines in the event that the tractor reservoir pressure drops to a predetermined value. As shown, the arrangement comprises a tractor protection valve device 76 that includes check valves 78 and 80 which are respectively positioned in the tractor emergency and service lines 42 and 52 and which are arranged to be closed by springs 82 and 84 in the direction of air flow. As shown, the valve device 76 comprises a body 86 provided with emergency inlet and outlet connections 88 and 90 which are respectively connected with the conduits 46 and 44, the emergency check valve 78 being positioned in an inlet chamber 92 and normally urged by the spring 82 to a position where communication between the inlet connection 88 and the outlet connection 90 is interrupted. At its lower end, the body 86 is provided with an inlet chamber 94 which communicates with the conduit 56 by way of an inlet connection 96. The service check valve 80 and the spring 84 are positioned within the chamber 94, and as has heretofore been pointed out, the action of the spring 84 is such as to tend to close the valve 80 in the direction of air flow in order to interrupt communication between conduits 56 and 54. When valve 80 is opened, by stem 98, conduits 56 and 54 are connected by way of connection 96 and chamber 94, the latter communicating with an outlet connection 100 by way of bore 102 and ducts 104 formed in a spool member 106.

Means are provided for controlling the operation of the check valves 78 and 80 in accordance with variations in the tractor reservoir pressure. As shown, such means includes a diaphragm 108 which is clamped between the body 86 and a cap 110 and which forms a diaphragm chamber 111 and an exhaust chamber 113 at the upper portion of the valve device 76. A valve actuating element 112 is secured to the diaphragm 108 and is formed with a bore 114 which communicates at all times with the exhaust chamber 113 through a plurality of openings 116. With the parts in the position shown, a diaphragm spring 118 is effective to move the diaphragm 108 and element 112 upwardly to connect the emergency line 42 to an atmospheric port 120 by way of the outlet 90, bore 114, openings 116 and the exhaust chamber 113. Under these conditions, the emergency check valve 78 and the service check valve 80 are closed. However, when the diaphragm 108 is moved downwardly against the action of the spring 118, the atmospheric connection of the emergency line 42 is cut off, as shown, as the lower end of the element 112 engages an exhaust valve 122 which is carried by the emergency check valve 78. Continued downward movement of the diaphragm 108 and the element 112 effects an opening of the emergency and service check valves 78 and 80 against the action of their respective springs.

In order to control the action of the diaphragm 108, the diaphragm chamber 111 is connected with the tractor reservoir 18 through conduit 123, governor 124, conduit 126 and conduit 22. The governor 124 is preferably like the governor 20 and is set to cut-out and cut-in at any predetermined desirable range. In practice, it has been determined that excellent results are obtained with a 50 p. s. i. cut-in pressure and a 75 p. s. i. cut-out pressure. It will be understood however, that this range is by way of example only, and that other pressures may be employed if desired. The 25 p. s. i. differential between the cut-out and cut-in pressures is sufficient to permit the tractor and trailer reservoirs 18 and 68 to equalize and still keep the equalizing pressure above the 50 p. s. i. cut-in pressure.

In operation, and assuming that the parts occupy the positions illustrated, with no air in the system, it will be seen that the emergency and service valves 78 and 80 are closed and that the emergency line 42 is connected with the atmospheric port 120. Under these conditions, the trailer brakes 62 are automatically connected with the trailer reservoir through the relay-emergency valve 70. As the air pressure is built up in the tractor reservoir 18, through operation of the compressor 10, the valve device 76 will remain in its illustrated position until the pressure in the reservoir 18 has reached the 75 p. s. i. cut-out pressure. At this pressure the governor 124 cuts out and connects conduits 123 and 126, thus delivering air to the diaphragm chamber 111 at 75 p. s. i., and causing the diaphragm 108 to move downwardly. This action closes the exhaust valve 122 and opens the emergency and service valves 78 and 80 against the action of their respective springs 82 and 84, thus interconnecting the vehicle emergency lines 42 and 64 to allow the trailer reservoir pressure to build up, as well as interconnecting the vehicle service lines 52 and 66.

When the system is in operation, with all reservoirs fully charged, it will be readily understood that so long as the pressure in the tractor reservoir 18 is above the 50 p. s. i. cut-in pressure of the governor 124, the operation of the tractor and trailer brakes in service is under the complete control of the operator through the brake valve 20. In the event however, of leakage from the tractor reservoir, due to any broken line on either vehicle, of such extent as to cause the tractor reservoir pressure to drop to the 50 p. s. i. cut-in pressure, it will be understood that in such event the governor 124 will operate to cut off the conduit 126 and to connect the conduit 123 with an atmospheric port at the governor. This action exhausts the diaphragm chamber 111, permitting the diaphragm 108 and element 112 to move upwardly to connect the emergency line 42 with the atmospheric port 120, and permitting the emergency and service valves 80 to close in the direction of air flow. Opening of the emergency line 42 causes an emergency application of the trailer brakes by reason of the operation of the relay-emergency valve 70, while closure of the emergency and service valves 78 and 80 prevents any further loss of air pressure from the tractor reservoir. Hence the pressure in the tractor braking system is conserved between 50 and 75 p. s. i., the respective cut-in and cut-out pressures of the governor 124.

Should the trailer emergency line break or develop a severe leak, the pressure in such line will exhaust and cause an emergency application of the trailer brakes by reason of the automatic operation of the relay-emergency valve 70. Since the emergency valve 78 is open, the pressure in the tractor reservoir 18 will bleed down through the break until the 50 p. s. i. cut-in pressure of the governor 124 has been reached. At this point, the governor 124 functions to exhaust the diaphragm chamber 111 of the valve device 76 and the emergency and service valves 78 and 80 will close in order to conserve the tractor reservoir pressure.

In the event that the trailer service line 66 should break or develop a severe leak, a brake application by the operator which would reduce the tractor reservoir pressure through the broken line to the 50 p. s. i. cut-in pressure of the governor 124 would cause operation of the valve device 76 in the manner heretofore described to close the emergency and service valves 78 and 80. Here again, the tractor reservoir pressure would be conserved between 50 and 75 p. s. i.

All of the foregoing is disclosed and claimed in the copending application referred to above.

The present invention includes an arrangement which is particularly adapted for use in the system heretofore described and which is effective to release the trailer brakes in the event of an undesired emergency application due to the pressure in the tractor reservoir 18 being less than the low pressure setting of the governor 124. As shown, such arrangement includes an over-ride reservoir 130 which is connected with the tractor reservoir 18 by means including a one-way valve 132 permitting flow of air from the reservoir 18 to the reservoir 130 only. Hence, full reservoir pressure from the reservoir 18, which may be of the order of 105 p. s. i., is conducted to the reservoir 130 and maintained therein. A two-way valve 134, which is mounted in such position as to be readily accessible to the operator, is connected with the over-ride reservoir 130 by conduit 135, and is also connected with the governor 124 and with the emergency inlet connection 88 by conduits 136 and 138 respectively. These latter connections include double check valves 140 and 142 of well known construction which allow flow of air from either of two sources to a single outlet.

Normally, the two-way valve 134 occupies a position where the conduit 135 is closed off and the conduits 136 and 138 are open to atmosphere. In the event however, of an undesired emergency application of the trailer brakes due to the pressure in the tractor reservoir 18 being below the low pressure setting of the governor 124, the valve 134 may be operated to connect the conduits 136 and 138 with the over-ride reservoir 130. Under these conditions, full reservoir pressure, which may be of the order of 105 p. s. i., is conducted to the governor 124 and to the emergency inlet 88. The governor 124 will promptly trip and apply full pressure to the diaphragm chamber 111 to cause the tractor protection valve to operate to open the emergency and service valves 78 and 80. As soon as the emergency valve 78 is opened, full pressure from the over-ride reservoir 130 will be delivered to the interconnected emergency lines 42 and 64 to release the emergency application of the trailer brakes due to the previous operation of the relay-emergency valve 70.

From the foregoing, it will be readily seen that the present invention provides a relatively simple but highly effective construction for releasing an undesired emergency brake application on the trailer due to a pressure in the tractor reservoir which is lower than the low pressure setting of the governor which controls the tractor protection valve. The use of the over-ride reservoir 130 and its one-way connection assures a separate source of fluid pressure on the tractor for operation at any time in the manner described.

While one embodiment of the invention has been shown and described herein, it will be readily understood by those skilled in the art that various modifications may be resorted to without departing from the spirit of the invention. Reference will therefore be had to the appended claims for a definition of the limits of the invention.

What is claimed is:

1. In a tractor-trailer braking system having a fluid pressure operated braking system on the tractor, a fluid pressure operated braking system on the trailer, and means comprising emergency and service lines respectively connecting the tractor and trailer systems, said tractor braking system including a reservoir of fluid pressure, valve means for controlling communication between said emergency and service lines, means responsive to variations of pressure of the fluid in said reservoir for controlling said valve means, a second reservoir of fluid pressure, and manually controlled means for connecting said responsive means to said second reservoir to separately control said valve means.

2. In a tractor-trailer braking system having a fluid pressure operated braking system on the tractor, a fluid pressure operated braking system on the trailer, and means comprising emergency and service lines respectively connecting the tractor and trailer systems, said tractor braking system including a reservoir of fluid pressure, valve means for controlling communication between said emergency and service lines, means responsive to a first predetermined pressure at said reservoir for opening said valve means and responsive to a second predetermined pressure at said reservoir, less than said first pressure, for closing said valve means, a second reservoir of fluid pressure, and manually controlled means for connecting said responsive means to said second reservoir to separately open said valve means.

3. In a tractor-trailer braking system having a fluid pressure operated braking system on the tractor, a fluid pressure operated braking system on the trailer, and means comprising emergency and service lines respectively connecting the tractor and trailer systems, said tractor braking system including a reservoir of fluid pressure, valve means for controlling communication between said emergency and service lines, means responsive to a first predetermined pressure at said reservoir for opening said valve means and responsive to a second predetermined pressure at said reservoir, less than said first pressure, for closing said valve means and for connecting the trailer emergency line to atmosphere, a second reservoir of fluid pressure, means for maintaining at all times the pressure in said second reservoir at a value higher than said first predetermined pressure, and manually controlled means for connecting said responsive means to said second reservoir to separately open said valve means, disconnect the trailer emergency line from atmosphere, and connect said latter line to the second reservoir.

4. In a tractor-trailer braking system having a fluid pressure operated braking system on the tractor, a fluid pressure operated braking system on the trailer, and means comprising emergency and service lines connecting the tractor and trailer systems, means including a tractor fluid pressure reservoir for supplying fluid pressure to the tractor and trailer braking systems, means responsive to a reduction in the pressure of the fluid in the tractor reservoir to a predetermined low value for causing an emergency application of the trailer braking system, a second tractor fluid pressure reservoir, means for maintaining at all times the pressure in said second reservoir at a value higher than said predetermined low value, and means including said second reservoir for releasing said emergency application.

5. In a tractor-trailer braking system having a fluid pressure operated braking system on the tractor, a fluid pressure operated braking system on the trailer, and means comprising emergency and service lines connecting the tractor and trailer systems, means including a tractor fluid pressure reservoir for supplying fluid pressure to the tractor and trailer braking systems, means including a device on the tractor responsive to a reduction in the pressure of the fluid in the tractor reservoir to a predetermined low value for venting the trailer emergency line to atmosphere and causing an emergency application of the trailer braking system, a second tractor fluid pressure reservoir, means for maintaining at all times the pressure in said second reservoir at a value higher than said predetermined low value, and means for connecting said device and second reservoir to disconnect the trailer emergency line from atmosphere, and connect the latter line and second reservoir to release the emergency application.

6. In a tractor-trailer braking system having a fluid pressure operated braking system on the tractor, a fluid pressure operated braking system on the trailer, and means comprising emergency and service lines connecting the tractor and trailer systems, a tractor fluid pressure reservoir, conduit means connecting said reservoir and the trailer emergency line, an emergency valve in said conduit means, other conduit means connecting said reservoir and the trailer service line, a service valve in said other conduit means, means including a fluid pressure responsive device operable when the reservoir pressure reaches a predetermined low value for closing both said valves and for connecting the trailer emergency line to atmosphere, and operable when the reservoir pressure reaches a predetermined high value for closing the connection between the trailer emergency line and atmosphere and for opening both said valves, a fluid pressure governor for connecting said reservoir to said device when the reservoir pressure reaches said predetermined high value and for disconnecting said reservoir and device when the reservoir pressure reaches said predetermined low value, means connected with said trailer braking system for causing an emergency trailer brake application when said device connects the trailer emergency line to atmosphere, and means for releasing said emergency trailer brake operation at will comprising a second tractor reservoir of fluid under pressure, means for maintaining the pressure of the fluid in the second reservoir at a value higher than said predetermined high value, and manually operable means for simultaneously connecting said pressure responsive device and said first named conduit means with said second reservoir whereby said device operates to close the connection between the trailer emergency line and atmosphere and to open both said valves and whereby fluid from said second reservoir is conducted to the trailer emergency line past the open emergency valve.

7. A tractor-trailer braking system of the character set forth in claim 6 wherein the manually operable means is connected to the first named conduit means through a double check valve.

NORMAN A. STEGMAN.

References Cited in the file of this patent

UNITED STATES PATENTS

| Number | Name | Date |
|---|---|---|
| 1,614,652 | Christensen | Jan. 18, 1927 |
| 2,084,707 | Robinson | June 22, 1937 |
| 2,232,883 | Neveu | Feb. 25, 1941 |
| 2,451,139 | Williams et al. | Oct. 12, 1948 |